Figure 1:
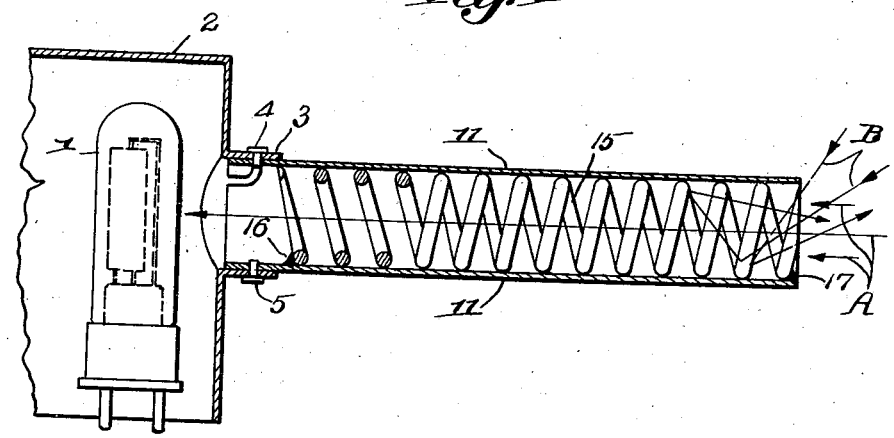
Figure 2:
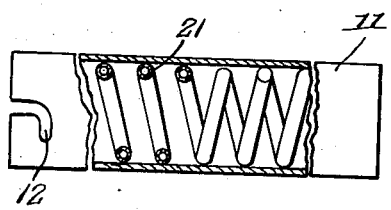
Figure 3:
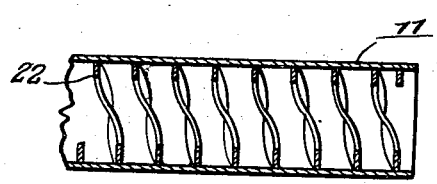
Figure 4:
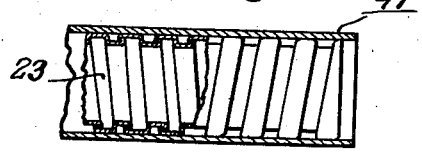
Figure 1:
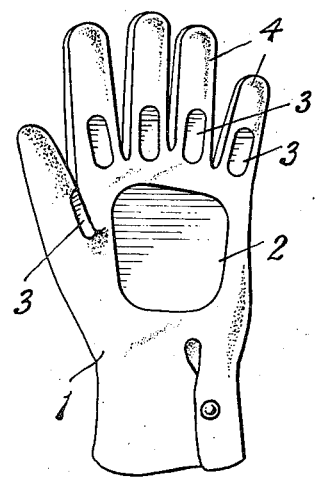
Figure 2:
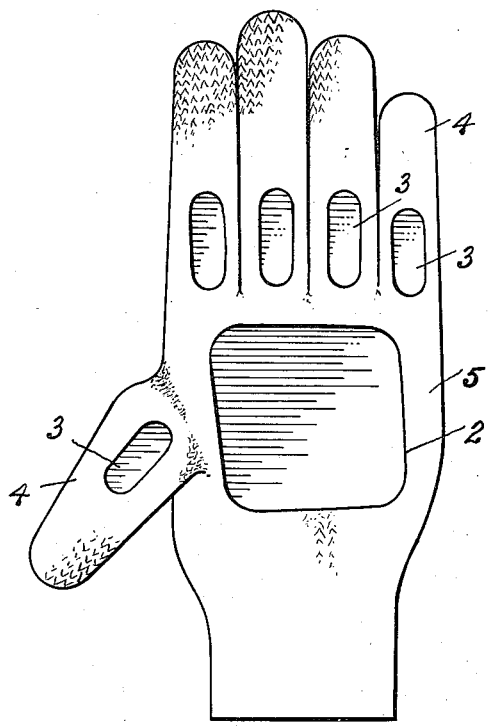
Figure 3:
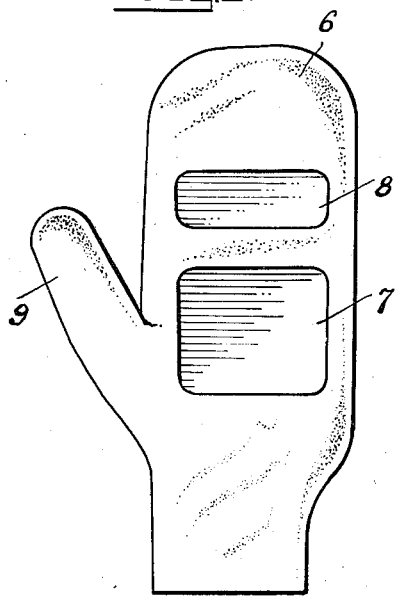

May 20, 1941.  A. G. B. METCALF  2,242,317
LIGHT HOOD
Filed Aug. 3, 1938

Inventor:
Arthur G. B. Metcalf,
by Roberts, Cushman & Woodbury
his Attys.

May 20, 1941. M. C. MOSIER 2,242,318

GLOVE

Filed Feb. 3, 1940

INVENTOR.
Milburn C. Mosier
BY Harry Rodzinsky
ATTORNEY.